Patented Dec. 16, 1924.

1,519,470

UNITED STATES PATENT OFFICE.

ROBERT E. WILSON, OF CAMBRIDGE, MASSACHUSETTS, AND JOSHUA C. WHETZEL, OF PITTSBURGH, PENNSYLVANIA.

IMPREGNATED CARBON AND PROCESS OF MAKING SAME.

No Drawing. Application filed January 22, 1921. Serial No. 439,245.

*To all whom it may concern:*

Be it known that we, ROBERT E. WILSON and JOSHUA C. WHETZEL, of Cambridge, Massachusetts, and Pittsburgh, Pennsylvania, respectively, citizens of the United States, have invented new and useful Improvements in Impregnated Carbons and Processes of Making Same, of which the following is a specification.

This invention relates to the impregnation of carbonaceous material, such as charcoal with metallic substances.

Charcoal, especially that which has been activated, has found extensive use in treating and sorbing gases. One of the problems which has received considerable attention in this art involves the treatment of the charcoal so as to increase its efficiency as a gas sorbent. It has been proposed to impregnate the charcoal with various agents to accomplish this result. There are a great number of impregnating materials which will increase the efficiency of charcoal against either acid gases or oxidizable gases but will not serve for treatment of both of these kinds of gases.

Among the objects of this invention is to impregnate charcoal or other carbonaceous material with certain agents and in such a way as to get the benefit of the action of the agent, which is usually a catalytic oxidizing action, without losing any of the sorbing value of the charcoal.

Another object is to produce a hard, stable product and to increase the effectiveness of the impregnating agent by its proper distribution among the particles and in the pores of the carbonaceous material; thereby producing a cheaper product and one which will also stand up longer than the impregnating agent itself. We have found that certain metals and metallic oxides, especially silver and silver oxide, copper and its oxides and zinc oxide, are especially well adapted to the above mentioned purposes.

The advantages of impregnating charcoal with such metals and oxides are as follows:

(1) The greatest benefit is due to increasing the catalytic action of the charcoal, which in the case of silver or copper or their oxides results in an increase of 1,000 or more per cent in the service time against such oxidizable gases as arsine for which ordinary charcoal has but little sorbing action.

(2) If copper oxide or copper plus silver oxides or copper plus zinc oxides constitute the impregnating agent, the presence of such basic constituent increases the value of the charcoal against acid gases such as phosgene, because of their tendency to neutralize the HCl set free. The service time against such gases is easily increased 50% or more.

(3) The third advantage might be considered a negative one in that these materials do not decrease the true sorbent action of charcoal for the relatively inert gases such as chloropicrin and mustard gas, which would result with the use of other types of impregnating agents.

The term "impregnated carbon" as ordinarily used is carbon such as charcoal, coke, lampblack, etc., which has been treated so as to incorporate some other substance such as a metal or oxide into the particles or pieces of carbon and produce a hard, stable product. Such incorporation increases the availability of the metal or oxide of the metal for a catalytic action, on account of the large surface exposed. Activated carbon is preferable for the most successful impregnation with metals or metallic oxides. By activated carbon is meant carbon which has been treated to make it more porous and highly absorbent than ordinary carbon.

Activated carbon may be produced by heating carbon, such as coal, coke, charcoal, etc., in the presence of mild oxidizing agents such as steam, $CO_2$, etc., at temperatures above 700° C. for several hours. If air is used as the oxidizing agent, the activation is carried on at lower temperature and for a shorter time than when the milder oxidizing agents are employed. Carbon thus activated has many times the sorbing power of untreated carbon.

There are a wide variety of methods by which these metals or metallic oxides may be incorporated in the carbon, and the resultant products have very similar desirable properties providing care is taken to eliminate all soluble salts or organic matter, and to deposit the material in such a way that it will not be removed by abrasion. Among the methods which may be used are the precipitation of the hydroxides on the carbon in aqueous solution, followed by subsequent washing and drying; sublimation of the metals or oxides and condensation on the carbon; impregnation with a decomposable salt of the metal (such as the nitrate) and heating to the temperature required for complete decomposition; the reduction of the metal from a solution of a salt by means of reducing materials present in or added to the carbon.

The amounts of impregnating materials which are used depend upon the purpose for which the final material is to be employed. For catalytic oxidation alone, amounts much less than 1% are practically as good as larger amounts; but for reacting with acid gases such as phosgene, amounts up to 10 or 12% are desirable. If the charcoal is highly activated, even 10 or 12% will not interfere with its sorbent action, but less active charcoals suffer in this respect if the metal or oxide content is increased beyond 6 or 8%.

For many purposes the preferred material for impregnation of the charcoal is metallic copper or oxides or mixtures of same, and in the following specific examples the process employing these materials will be given as indicative of the application of this invention.

(1) Charcoal is impregnated with a solution of a copper salt, preferably the sulphate or nitrate. The excess solution is drained off and then caustic soda is added to precipitate copper hydroxide in the pores of the charcoal. The charcoal is then washed to free it from sodium sulphate or other soluble impurities and subsequently dried. Certain objections incident to this method are losses of copper on account of excessive precipitation on the outside of the charcoal granules and the difficulty of washing out the sodium salt and free alkali.

(2) Charcoal is impregnated with the copper salt and then iron filings, zinc dust or other finely divided metal electro positive to copper is scattered thereon with continued stirring or raking. Electrolytic action causes the copper to precipitate on the surface and in the pores of the charcoal granules and to adhere very firmly. The zinc or iron sulphate or other salts may be then washed out with hot water and the material dried preferably at a fairly high temperature, for example 300°C, in the presence of a small amount of air to complete the removal of the sulphate.

(3) In this method the copper is reduced by organic or inorganic reducing agents such as sugar, formaldehyde, etc. There are a great number of reducing agents suitable for this purpose. In this process it has been found that an ammoniacal solution of copper gives very good results.

(4) Charcoal is heated up with the copper salt and the latter is reduced by the action of the charcoal itself at the high temperature. This process gives very good results in the case of the nitrate, where oxides of nitrogen are driven off. The sulphate works well only in the presence of an excess of air as otherwise some of the sulphate is reduced to copper sulphide which injures the sorbing properties of the charcoal. In the presence of air, however, this can be carried out but there is some loss of charcoal due to oxidation.

Among the uses for which impregnated and coated carbon are of value, the following will serve as illustrations:

Carbon impregnated with metals or metallic oxides has a high sorbing power or sorptive activity for certain gases such as chlorine, arsine, phosgene, hydrocyanic acid, carbon monoxide, cloride of sulphur, etc. Carbon impregnated with certain metals or oxides also serves as a most excellent catalyzer. The impregnated carbon holds the metal or metallic oxide or both in a porous, finely divided state. This condition promotes chemical activity, and the fine pores of the metal or oxides together with the fine pores of the carbon will cause certain gases to react with or combine with each other under certain conditions.

A special use which has been found for the carbon impregnated with metals or oxides is in the removal of phosphine or arsine from gas mixtures such as ammonia, acetylene, etc. or mixtures containing ammonia or acetylene. Under proper conditions, the phosphine and arsine may be quantatively oxidized while the other gases which are present undergo little or no oxidation. It is thus seen that by means of these impregnated charcoals, selective oxidation and removal of undersirable substances such as arsine and phosphine from gases may be brought about. Under these conditions the impregnated carbon acts as a catalytic oxidizing agent and may also serve as a sorbent for other gases because the insolubility of the impregnating material prevents interference with the sorptive capacity of the carbon for neutral gases. Ordinary soluble catalyzers introduced into charcoals interfere with the sorptive properties of the charcoal.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

Claims:

1. Hard, stable, sorbing material, comprising carbon impregnated with material containing metal and metal oxide.

2. Hard, stable, sorbing material, comprising activated carbon impregnated with material containing metallic material.

3. Hard, stable, sorbing material, comprising activated carbon impregnated with material containing metal and metallic oxide.

4. Hard, stable, sorbing material, comprising carbon impregnated with material containing copper.

5. Hard, stable, sorbing material, comprising activated carbon impregnated with material containing copper.

6. Hard, stable, sorbing material, comprising activated carbon impregnated with material containing copper oxide.

7. Hard, stable, catalytic, oxidizing agent, comprising carbon impregnated with material containing copper and copper oxide.

8. Hard, stable, catalytic, oxidizing agent, comprising activated carbon impregnated with material containing copper and copper oxide.

9. Hard, sorbing, catalytic material, comprising carbon impregnated with material containing copper, copper oxide, silver and silver oxide.

10. In a process of producing a sorbing, catalytic oxidizing agent, impregnating activated carbon with a salt of a metal and then converting the metallic salt into a product comprising the metal by adding another finely divided metal thereto, the latter being electro positive to the first metal.

ROBERT E. WILSON.
JOSHUA C. WHETZEL.